United States Patent
Stephen

(10) Patent No.: US 7,195,436 B1
(45) Date of Patent: Mar. 27, 2007

(54) INSET PANEL FASTENER

(75) Inventor: Douglas Stephen, Pomona, CA (US)

(73) Assignee: NMC Group, Inc., Pomona, CA (US)

( * ) Notice: Subject to any disclaimer, the term of this patent is extended or adjusted under 35 U.S.C. 154(b) by 0 days.

(21) Appl. No.: 11/006,181

(22) Filed: Dec. 6, 2004

(51) Int. Cl.
*F16B 1/00* (2006.01)

(52) U.S. Cl. .................. 411/82.1; 411/82; 411/373; 411/376

(58) Field of Classification Search ............... 411/82.1, 411/82, 373, 376
See application file for complete search history.

(56) References Cited

U.S. PATENT DOCUMENTS

| | | | | |
|---|---|---|---|---|
| 3,019,865 A | * | 2/1962 | Rohe ..................... | 52/787.12 |
| 3,339,609 A | * | 9/1967 | Cushman ................ | 411/82.1 |
| 3,504,723 A | * | 4/1970 | Cushman et al. ........ | 411/82.1 |
| 3,964,531 A | * | 6/1976 | Schenk .................. | 411/82.1 |
| 4,121,963 A | * | 10/1978 | Yardley et al. .......... | 156/273.3 |
| 4,752,171 A | * | 6/1988 | Pliml, Jr. ............... | 411/171 |
| 4,812,193 A | * | 3/1989 | Gauron .................. | 156/293 |
| 4,817,264 A | * | 4/1989 | Worthing ................ | 29/512 |
| 4,846,612 A | * | 7/1989 | Worthing ................ | 411/82.1 |
| 4,902,180 A | | 2/1990 | Gauron .................. | 411/82 |
| 4,973,208 A | | 11/1990 | Gauron .................. | 411/82 |
| 4,993,902 A | * | 2/1991 | Hellon ................... | 411/430 |
| 5,240,543 A | * | 8/1993 | Fetterhoff et al. ....... | 156/293 |
| 5,302,069 A | * | 4/1994 | Toth et al. .............. | 411/429 |
| 5,378,099 A | * | 1/1995 | Gauron .................. | 411/82.1 |
| 5,431,518 A | * | 7/1995 | Young et al. ............ | 411/429 |
| 5,437,750 A | * | 8/1995 | Rinse et al. ............. | 156/73.1 |
| 5,553,984 A | * | 9/1996 | Smith .................... | 411/429 |
| 5,632,582 A | | 5/1997 | Gauron .................. | 411/82 |
| 5,840,147 A | * | 11/1998 | Grimm ................... | 156/272.2 |
| 5,843,265 A | * | 12/1998 | Grimm ................... | 156/273.7 |
| 6,096,256 A | * | 8/2000 | Aretz .................... | 264/263 |
| 6,153,035 A | * | 11/2000 | Van Laeken ............ | 156/73.5 |
| 6,217,695 B1 | * | 4/2001 | Goldberg et al. ........ | 156/244.17 |
| 6,264,412 B1 | * | 7/2001 | Nakamura et al. ....... | 411/352 |
| 6,273,985 B1 | | 8/2001 | DeLouise et al. ....... | 156/273.3 |
| 6,278,562 B1 | * | 8/2001 | Lovett ................... | 359/886 |
| 6,299,596 B1 | * | 10/2001 | Ding .................... | 604/96.01 |
| 6,350,093 B1 | * | 2/2002 | Petersen et al. ......... | 411/82.1 |
| 6,485,130 B2 | * | 11/2002 | DeLouise et al. ....... | 347/63 |
| 6,488,460 B1 | * | 12/2002 | Smith et al. ............ | 411/353 |

(Continued)

OTHER PUBLICATIONS

Plastics Joining, "Ultrasonic Welding Technique", author unknown, downloaded from ☐☐www.twi.co.uk/j32k/protected/band_3/pjkultrason.html and date verified by www.archive.org as posted on or before Dec. 13, 2001, 4 pag.*

*Primary Examiner*—Katherine Mitchell
(74) *Attorney, Agent, or Firm*—Drummond & Duckworth

(57) ABSTRACT

An inset panel fastener anchors into honeycomb substrates employed in the aircraft industry. The inset panel fastener provides significantly increased load carrying capabilities with a simple inexpensive construction. The inset panel fastener includes a plastic casing and a central floating fastener element. The casing includes a body, disk and cap. The body is generally barrel shaped including a central chamber for holding the fastener element which is preferably a female fastener. The disk radially projects from the top of the body and includes a fill hole and vent hole. Meanwhile, the cap engages and covers the bottom of the barrel shaped body. The cap is affixed in place using a weld, such as a sonic weld.

6 Claims, 5 Drawing Sheets

U.S. PATENT DOCUMENTS 6,695,527 B2 * 2/2004 Seaux et al. .................. 404/34
2002/0100540 A1 * 8/2002 Savitski et al. ............. 156/157
2002/0124952 A1 * 9/2002 Sallavanti et al. ....... 156/272.2
2003/0196761 A1 * 10/2003 Sallavanti et al. ....... 156/380.9

* cited by examiner

INSET PANEL FASTENER

BACKGROUND OF THE INVENTION

The present invention relates to mounts and fasteners. More specifically, the present invention relates to inset panel fasteners which are particularly useful within the aircraft industry.

Many types of mounting devices have been developed for holding one or more objects to a support surface. For example, inset-type fasteners are generally anchored into a structure and include an engagement portion, such as the male or female threads of a screw, for securing objects to the structure. Inset fasteners are particularly advantageous when a strong connection between the structure and object cannot be readily obtained through use of a surface mounted structure.

Sandwich panels are used extensively in the aircraft and marine industries. These sandwich panels typically are made of fiberglass or similar material formed in a honeycomb structure. The honeycomb structure is then typically sandwiched between outer layers of aluminum panels or the like. These sandwich panels are preferred as a result of their relatively inexpensive price, lightweight and high strength. In order to anchor objects to the sandwich panel, inset panel fasteners are typically used. To anchor the inset panel fastener in place, a cavity is typically formed directly through the outer aluminum layer into the honeycomb core using a drill or the like. The inset panel fastener is then positioned within the cavity and an adhesive or other binding material is injected into the cavity to secure the fastener to the honeycomb core. Since the cavity is cylindrical, most inset panel fasteners include a cylindrical barrel having a central bore. The central bore typically includes female threads functioning as a fastener element. Alternatively, some inset panel fasteners include a floating fastener element in the form of a nut which also includes female threads which is floatingly positioned within the bore. Examples of inset panel fasteners including floating elements include U.S. Pat. Nos. 4,973,208 and 5,632,582. Inset panel fasteners have been manufactured from a variety of materials. For example, it has been known to manufacture an inset panel fastener of various metals including steel and titanium. U.S. Pat. No. 4,846,612 describes a one piece inset panel fastener made from a thermoplastic. Moreover, inset panel fasteners have been constructed to include a plastic outer casing and a metal inner fastener element. Unfortunately, the prior art structures and materials have posed problems.

All metal fasteners provide extremely high strength to a fastener element. However, adhesives and potting materials typically do not bond to an all metal material, such as titanium, as well as to a plastic material. They are also heavy and expensive. Meanwhile, inset panel fasteners which include a plastic casing suffer from disadvantages of their own. Plastic fasteners will fracture at lower stress values than all metal inset panel fasteners. Moreover, most plastic inset panel fasteners include a casing constructed into disengageable parts. For example, as shown in U.S. Pat. Nos. 4,973,208 and 5,632,582, the inset panel fastener includes a casing including a cylindrical barrel and a bottom cap. The cylindrical barrel includes a central bore for positioning a female fastener element, preferably constructed of metal. The barrel further includes an opening or entrance formed at the barrel's top for insertion of a male fastener element to engage the female fastener element. Projecting radially from the top of the barrel, the inset panel fastener further includes a disk which has a diameter greater than the diameter of the barrel to form a cavity space around the barrel's body for injection of an adhesive or potting material within the sandwich panel cavity. A fastener element is inserted into the cylindrical barrel's central bore through an access opening located at the bottom of the body. The access opening is then covered by a plastic cap to prevent adhesive material from flowing into the plastic body's central bore which would prevent the fastener element from floating within the inset panel fastener. The cap is typically locked to the cylindrical barrel using a press-fit or locking projections such as shown in U.S. Pat. Nos. 4,973,208 and 5,632,582.

The inset panel fasteners having two part casings are simple to manufacture and inexpensive. Moreover, as a result of the use of locking projections, the casings are simple to assemble. Unfortunately, the inset panel fasteners provide a relatively low pull strength in that the panel fastener will fail and be pulled from the sandwich panel cavity upon a relatively low load being exerted upon the fastener.

Thus, it would be advantageous to provide an improved inset panel fastener which provided improved pull strength.

It would be an additional advantage to provide an improved panel fastener that was manufactured of plastic in a two part casing configuration.

It would be still an additional advantage to provide an improved inset panel fastener that was lightweight, inexpensive to manufacture, provided improved pull strength, and incorporated a floating fastener element.

SUMMARY OF THE INVENTION

The present invention addresses the aforementioned disadvantages by providing an improved plastic inset panel fastener, primarily for use with honeycomb sandwich panels utilized in the aircraft industry.

The inset panel fastener includes a casing sized to be received within a recess opening in a structure and a fastener element located within the casing which is adapted to cooperate with a screw fastener or the like to affix an object to the structure. The casing is made of plastic such as nylon. The casing includes a body portion including a cylindrical barrel having a top, a bottom and a central bore which extends through the body to form a central chamber. Each end of the bore is open. Specifically, the body includes a fastener entrance located at the top of the body and a fastener access opening located at the bottom of the body.

The inset panel fastener casing further includes a plastic disk which projects radially outward from the top of the body to form an annular cavity space around the body. The disk further includes a fill hole and vent hole. Adhesive is injected into the fill hole until the annular cavity is filled and adhesive begins to project from the vent hole.

The inset panel fastener further includes a fastener element which is positioned within the plastic body's central chamber. The fastener element may be any construction known to those skilled in the art. However, a preferred fastener element is a female fastener made of metal, such as aluminum, steel or titanium. Furthermore, preferably the fastener element includes radially projecting tabs which are sized to engage the plastic body so as to inhibit unwanted rotation or withdrawal of the fastener.

The inset panel fastener of the present invention also includes a plastic cap which engages and covers the bottom of the fastener's cylindrical body. The plastic cap may be of various constructions known to those skilled in the art. For example, the cap may include legs as illustrated in U.S. Pat. No. 5,632,582. Alternatively, the cap may be substantially be "cup" shaped and include a central recess as described in U.S. Pat. No. 4,973,208. However, in a preferred embodiment the cap is a simple round saucer construction which provides a simple press-fit engagement to the fastener's cylindrical barrel to substantially cover the barrel's fastener access opening.

Of importance to the present invention, the inset panel fastener further includes a weld for affixing the panel fastener's cap to the cylindrical barrel. More specifically, it has been determined that the simple press-fit engagement and locking projection constructions of the prior art significantly weaken the engagement of an inset panel fastener within a sandwich panel cavity. Meanwhile, this significant disadvantage has been overcome by providing a weld between the plastic body and plastic cap which eliminates a significant failure point within the sandwich panel fastener assembly. In a preferred embodiment, the plastic body and cap are constructed of nylon and the two components are welded together using a sonic weld. Various sonic welding techniques can be selected by those skilled in the art without undue experimentation.

Accordingly, it is a principal object of the present invention to provide an improved inset panel fastener which provides increased pull strength.

It is another object of the present invention to provide an inset panel fastener which is inexpensive to manufacture and assemble.

These and other further and more specific objects and advantages of the invention will be apparent to those skilled in the art from the following detailed description taken in conjunction with the drawings.

DETAILED DESCRIPTION OF THE INVENTION

Figure 1:
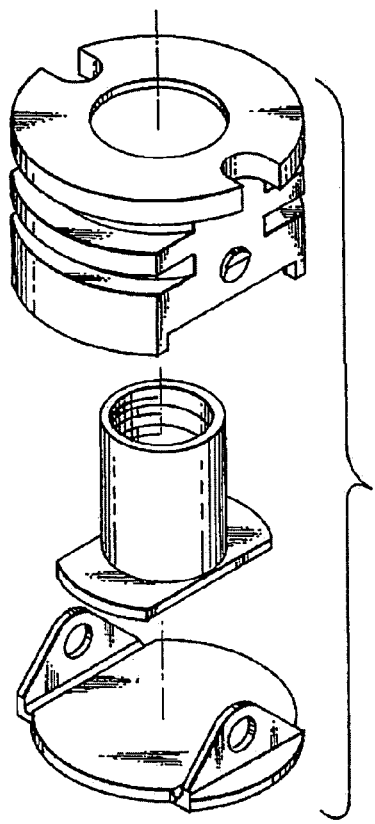
FIG. 1 is a perspective exploded view of an inset panel fastener of the prior art.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 4–9, the inset panel fastener of the present invention includes a casing 3 and a fastener element 35. The casing includes a body portion 5 and a cap 27. Cavities formed in sandwich panels are typically round as they are typically formed by a drill. Accordingly, the inset panel fastener of the present invention preferably includes a casing having a body portion 5 that is cylindrical forming a hollow barrel 6. The barrel includes a central vertically extending bore 7 forming a mating fastener entrance 9 and a fastener insertion opening 11.

The inset panel fastener casing 3 further includes a disk portion 13 which radially projects from the top of the body 5. The disk 13 has a diameter greater than the diameter of the body to form an annular cavity space 15 when the inset panel fastener is placed within the cavity formed within a sandwich panel. The disk also includes a fill hole 19 and a vent hole 21 for the introduction of an adhesive material.

The inset panel fastener's casing 3 further includes a cap 27 which is sized and constructed to engage and cover the body's bottom side. Once the cap 27 is positioned in place, it covers the fastener insertion opening 11 so as to prevent adhesives or potting materials from entering into the casings central chamber 8.

Figure 2:
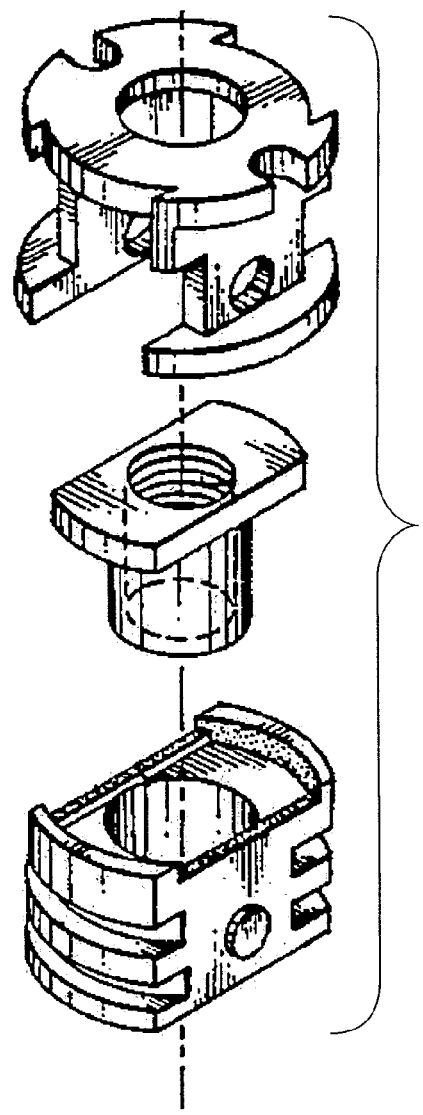
FIG. 2 is a perspective exploded view showing a second inset panel fastener of the prior art.

The cap may be constructed in various shapes as can be determined by one skilled in the art. For example, the cap 27 may be locked to the body portion 5 using complicated locking arm and detent constructions such as shown in FIGS. 1 and 2. However, in a preferred embodiment the cap is constructed in a simple manner and includes a substantially flat circular bottom 29 and an annular rim 31. Meanwhile, the body includes a corresponding edge 23 which is sized to engage the inside of the cap's rim in a press-fit manner.

Figure 3:
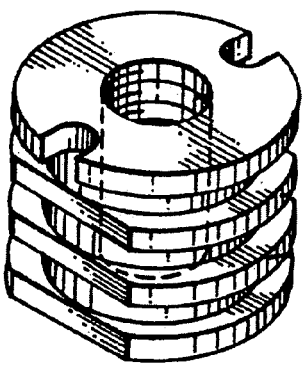
FIG. 3 is a perspective view illustrating a third inset panel fastener of the prior art.
Figure 4:
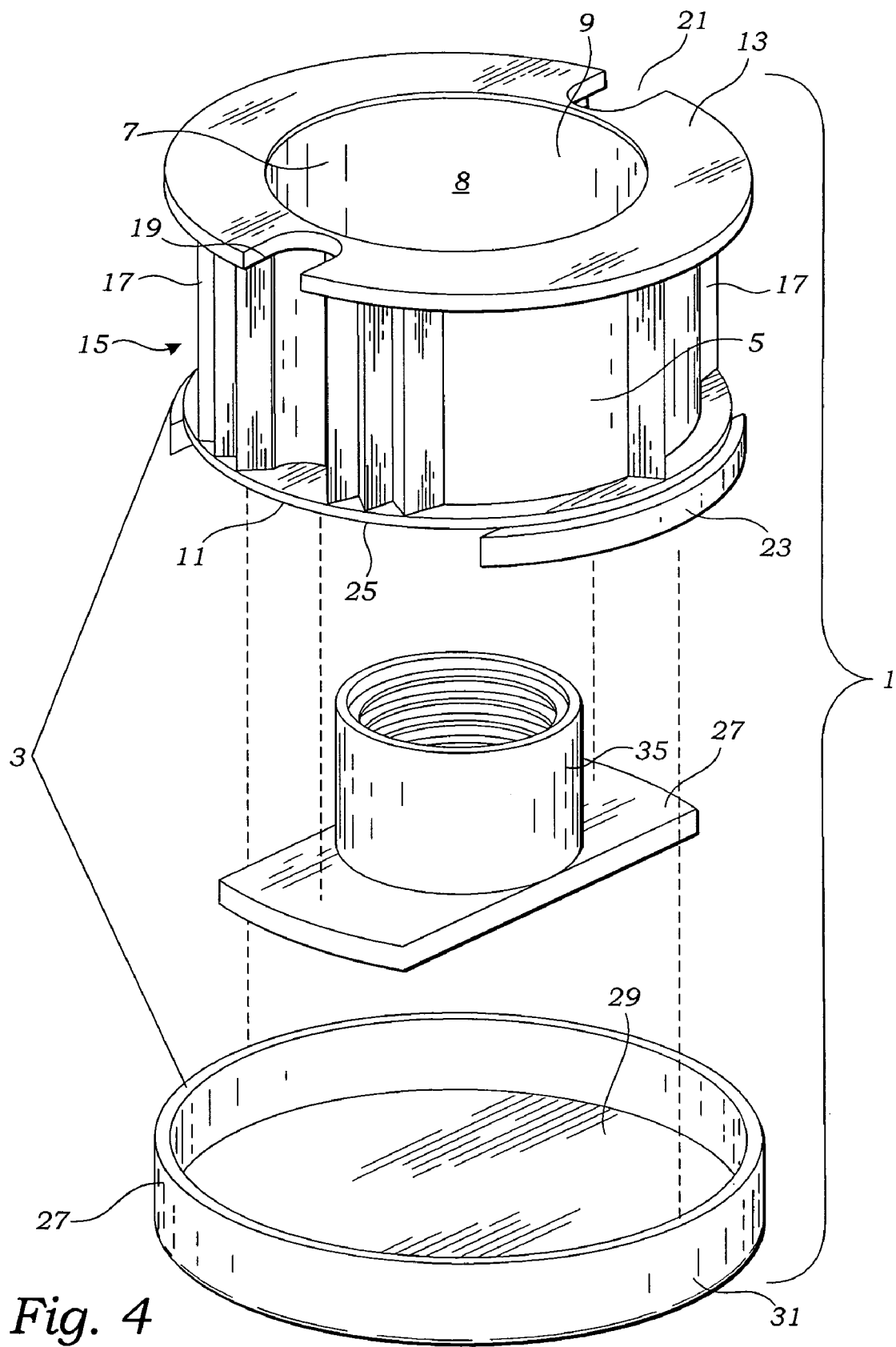
FIG. 4 is an exploded perspective view of the inset panel fastener of the present invention.
Figure 5:
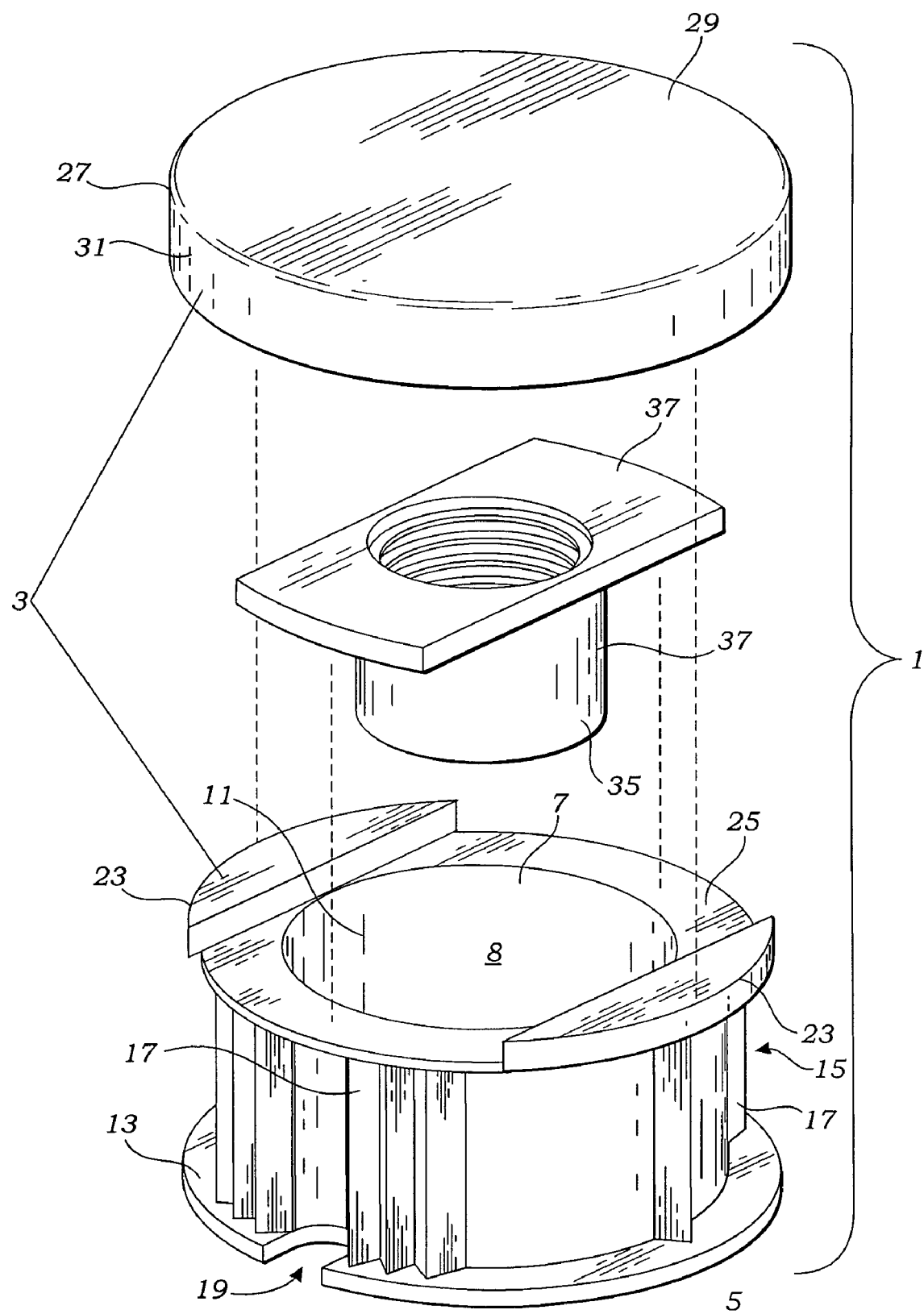
FIG. 5 is an exploded perspective view of the inset panel fastener of the present invention as seen from below.
Figure 6:
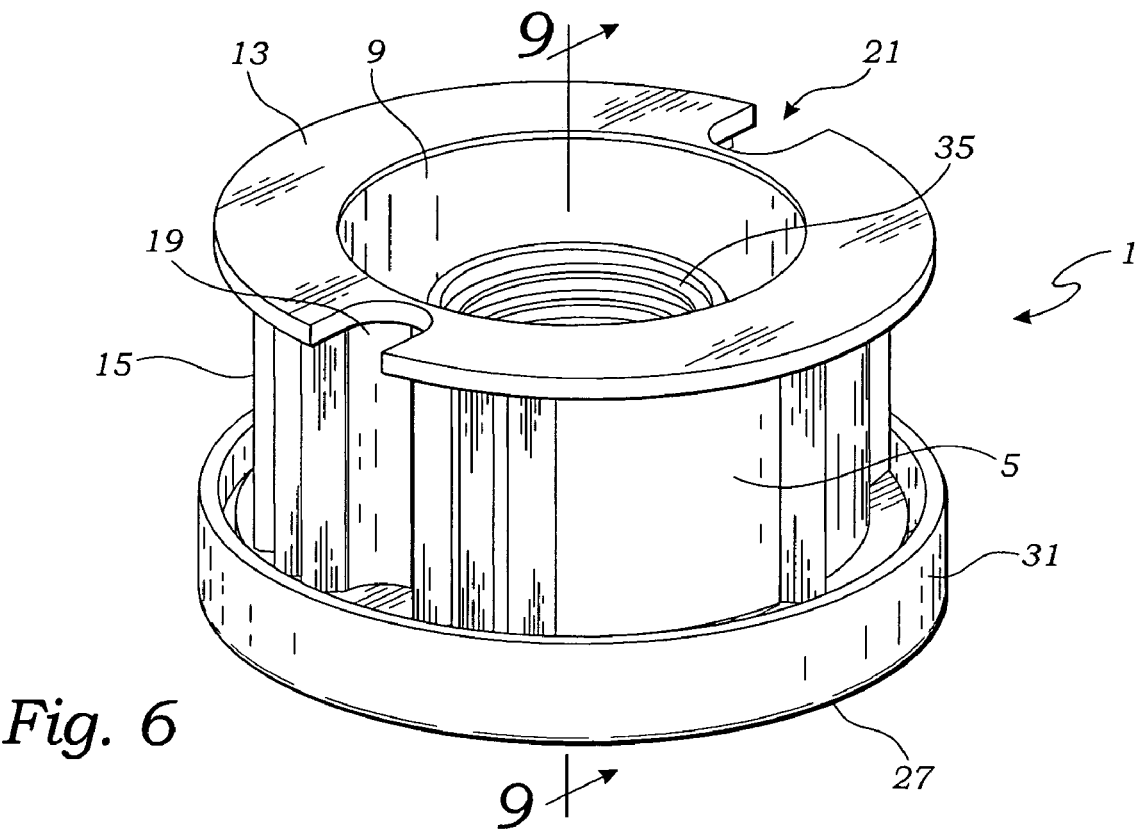
FIG. 6 is a perspective view of the inset panel fastener of the present invention.
Figure 7:
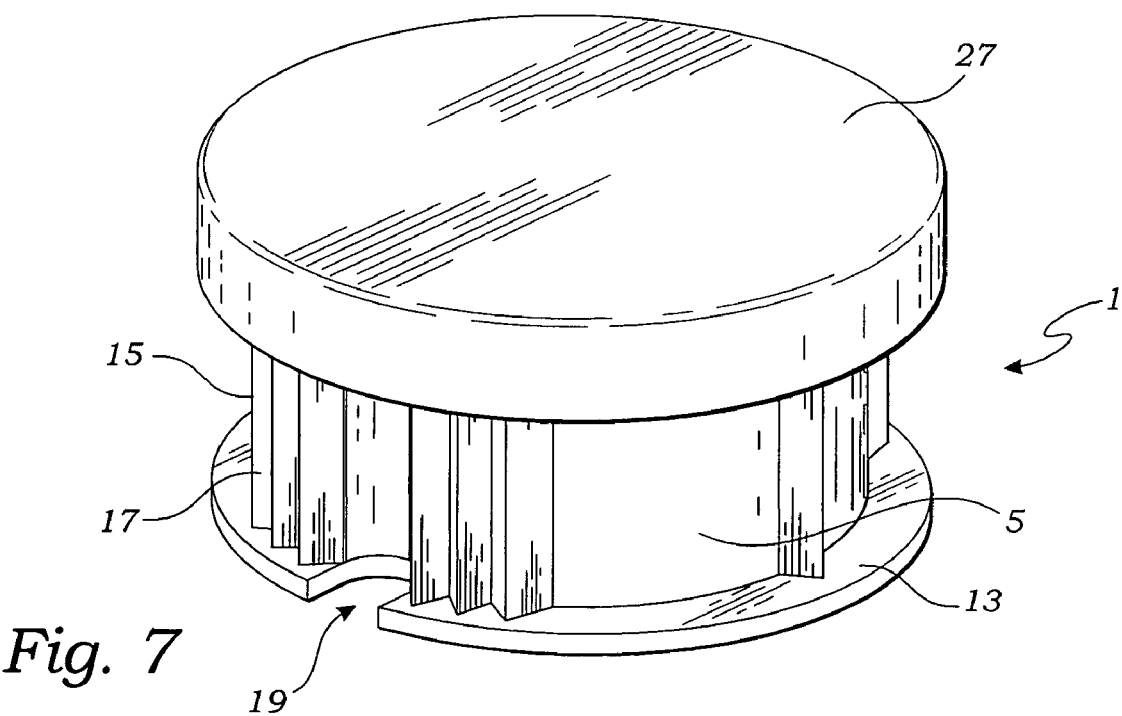
FIG. 7 is a perspective view of the inset panel fastener of the present invention as seen from below.

Preferably, the casing 3 further includes one or more vertical ridges 17. The ridges inhibit rotation of the inset panel fastener relative to the sandwich panel once the adhesive has been applied and cured. Though the inset panel fastener 1 of the present invention preferably includes ridges for preventing relative rotation of the inset panel fastener within a substrate, alternative constructions for preventing rotation are intended to be within the scope of the invention. For example, the casing may include simple protuberances, which project into the hardened resin, or slots or cutouts such as shown in FIGS. 1–3 for receiving excess resin material.

In addition to the casing, the inset panel fastener 1 of the present invention includes a floating fastener element 35. As shown in the figures, the fastener element is preferably a female fastener including internal threads for receiving the mating threads of a male fastener. The fastener element 35 is constructed so as not to rotate within the casing's central chamber 8. To this end, in a preferred embodiment the fastener element includes tabs 37 which project outwardly to reside within slots 25 formed within the casing 3 between the body portion 5 and cap 27. Again, alternative constructions for preventing rotation of the fastener element relative to the casing are within the scope of the invention. For example, the fastener element may be a traditional nut including a hexagonal shape sized for residing within a central chamber having six sides for engaging the sides of the nut and preventing relative rotation.

Figure 8:
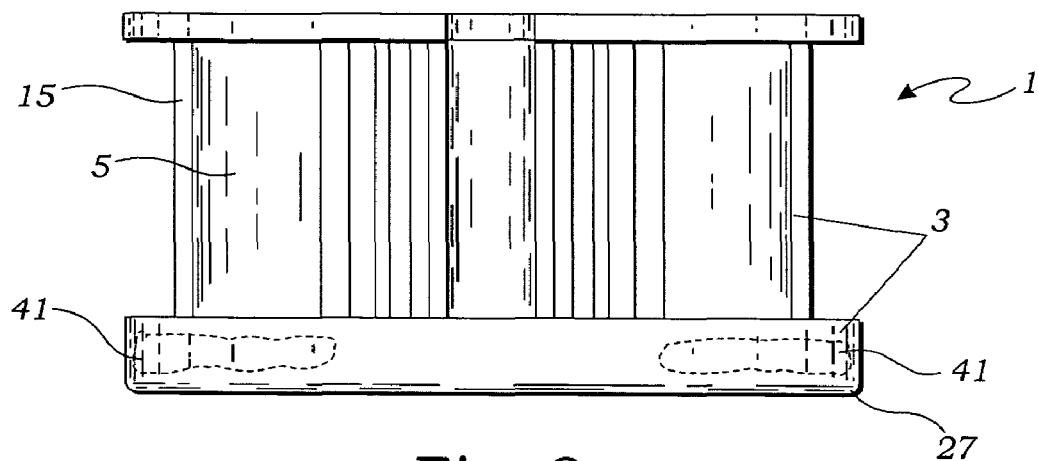
FIG. 8 is a side view of the inset panel fastener of the present invention illustrating a weld between components.
Figure 9:
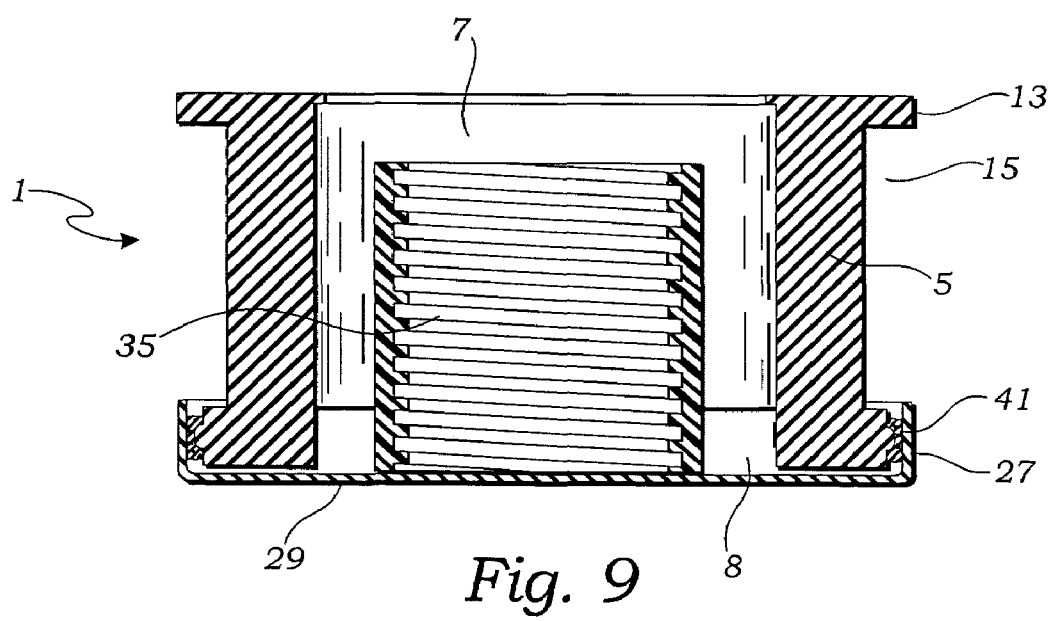
FIG. 9 is a cutaway side view of the inset panel fastener of the present invention.

The casing 3, including body and cap may be constructed of various plastics as can be selected by those skilled in the art. However, the casing is preferably constructed of nylon. In addition to the cap 27 affixing to the body portion 5 by a press-fit engagement, as shown in FIGS. 8 and 9, a primary aspect of the present invention is that the inset panel fastener include a weld 41 affixing the cap to the body portion. The weld 41 may be accomplished using various welding techniques as can be selected by those skilled in the art. For example, where the casing is constructed of a thermoplastic material, the application of heat using traditional heat sources may be used to weld the cap to the body. However, in a preferred embodiment the casing and cap are constructed of nylon and a sonic welding technique is employed to weld the cap to the body.

The welding of the cap to the body has resulted in significant unexpected improvements. In particular, pull tests have determined that the welding of the cap to the body results in the inset panel fastener providing significantly increased load bearing capabilities within a sandwich panel. Previously it was thought that the engagement of the resin to the body 5 and disk 13 provided the predominant load bearing capabilities of the insert panel fastener. It is for this reason, that little attention was paid to the manner of affixing the cap to the casing's body 5. This resulted in the adoption of various press-fit constructions and constructions using simple arms and detents such as shown in FIGS. 1 and 2. Unfortunately, these inset panel fasteners failed at higher loads, resulting in the inset panel fastener being ripped from the substrate. Meanwhile, Applicant has determined that the inset panel fastener will provide significantly increased load bearing capabilities where the cap has been welded to the body.

While several particular forms of the invention have been illustrated and described, it will be apparent that various modifications can be made without departing from the spirit and scope of the invention. Accordingly, it is not intended that the invention be limited except by the following claims. Having described my invention in such terms as to enable persons skilled in the art to understand the invention, recreate the invention and practice it, and having identified the presently preferred embodiments thereof,

I claim:

1. An inset panel fastener for being received into a structure cavity for affixing objects to the structure, the inset panel fastener comprising:

a plastic casing including plastic body, a plastic disk and a plastic cap;

said plastic body including a cylindrical barrel having a top, a bottom and a bore extending through said body to form a central chamber, a fastener entrance located at the top of said body and a fastener access opening located at the bottom of said body;

said plastic disk radially projecting from said top of said body; said disk having a diameter greater than the diameter of said body to form a cavity space around said body; said disk further including a fill hole and a vent hole at the edge of said disk for allowing the injection of resin into said cavity space;

said plastic cap engaging said body and covering said fastener access opening;

a fastener floatingly disposed within said central chamber; and a weld affixing said plastic cap to said plastic body wherein the material of said plastic cap and plastic body both melt and coalesce to form a bond.

2. The inset panel fastener of claim 1 wherein said weld is a sonic weld.

3. The inset panel fastener of claim 1 wherein said plastic body and plastic disk are constructed in one piece.

4. The inset panel fastener of claim 1 wherein said plastic body, plastic disk and plastic cap are constructed of nylon.

5. The inset panel fastener of claim 1 further comprising one or more ridges vertically positioned in said cavity space for restricting rotation of the inset panel fastener when adhered within a structure cavity.

6. The inset panel fastener of claim 1 wherein said fastener is a female fastener.

* * * * *